(No Model.)
J. ADAMS.
HYDROCARBON BURNER.
No. 427,819. Patented May 13, 1890.
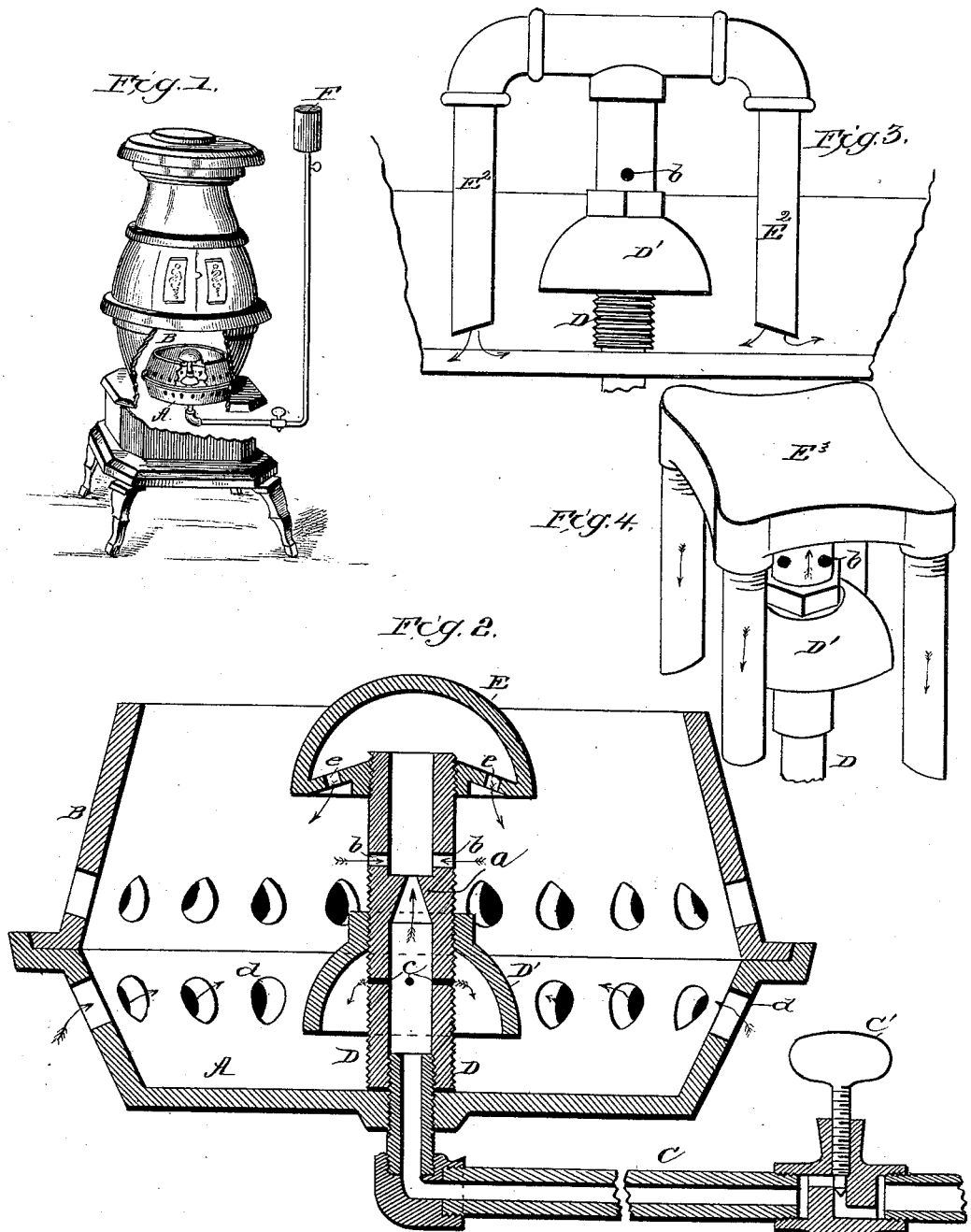
WITNESSES:
Fred G. Dieterich
Edw. W. Byrn.
INVENTOR:
John Adams
BY Munn & Co.
ATTORNEYS.

UNITED STATES PATENT OFFICE.

JOHN ADAMS, OF NASHVILLE, TENNESSEE.

HYDROCARBON-BURNER.

SPECIFICATION forming part of Letters Patent No. 427,819, dated May 13, 1890.

Application filed November 30, 1888. Renewed November 11, 1889. Serial No. 329,832. (No model.)

*To all whom it may concern:*

Be it known that I, JOHN ADAMS, of Nashville, in the county of Davidson and State of Tennessee, have invented a new and useful Improvement in Hydrocarbon-Burners, of which the following is a specification.

My invention is in the nature of an improved hydrocarbon-burner, designed especially for heating-stoves, but applicable also to other uses; and it consists in the peculiar construction and arrangement of parts which I will now proceed to describe.

Figure 1 is a perspective view of a stove with the burner applied to the same, the casing of the stove being broken away to show the position of the burner. Fig. 2 is a vertical sectional view, on a larger scale, of the burner itself; and Figs. 3 and 4 are perspective views, on a smaller scale, of modifications.

In the drawings, A represents a pan, which is made of a size to fit conveniently in the fire-pot of the stove and to rest upon the grate-bars or about the horizontal plane thereof. This pan has sides that flare outwardly and are provided with a series of holes $d$, forming air-inlets. On top of this pan there rests a ring or shell B, open at its upper end and tapering to a smaller diameter at the top. Through the middle of the pan A there rises an oil-pipe C, having a valve C′, and communicating with an oil-reservoir F, placed in an elevated position. Onto the end of the oil-pipe C, in the bottom of the pan, there is screwed the burner-tube D, which stands in a vertical position. The lower portion of this burner-tube is screw-threaded on the outer surface, and has a bell-shaped flange D′ screwed onto the same, and has a series of holes $c$ just below the same. Just above the bell-shaped flange the chamber in the tube converges to a small throat $a$, and immediately above this are air-inlet holes $b$. Still farther up the tube is exteriorly screw-threaded, and upon the same is detachably screwed a dome-shaped cap E, having on its under side outlet-holes $e$.

The operation of this burner is as follows: Oil from the reservoir is admitted by opening valve C′, which oil rises up in tube D and flows through holes $c$ into the pan, where it is ignited. The flame from this oil gradually heats the burner until the oil rising within the tube becomes volatilized as fast as it is fed. A portion of the vapors issuing through the holes $c$ into the pan becomes mixed with the air that passes in through holes $d$ in the sides of the pan and fills the pan with flame, which is concentrated against the burner and thrown down into the bottom of the pan by the bell-shaped flange D′. Another portion of the vapor rising swiftly through the contracted throat $a$ in the burner-tube draws in air through the openings $b$, and rising into the dome-shaped cap E becomes thoroughly mixed and heated in the same to a high degree, and finally issues through openings $e$ in the underneath edges of the cap and burns in jets of intense heat and perfect combustion. These jets being directed downwardly into the fire-chamber, the heat is kept down in the lower part of the stove, where it is most wanted. This downward direction of the flame is an important feature of my invention, since it serves to keep the heat down in the bottom of the pan and thus volatilizes the oil and converts it into vapor before it issues in the pan, thus putting it in the condition for perfect admixture with the air and producing an active combustion and an intense white flame. This white flame serves, when mica panes are used in the stove, to give light in the room in the place of a lamp.

As a modification of my invention I may (in the place of the cap E) use two or more downwardly-bent tubes E², as in Fig. 3, which direct the flames to the bottom of the pan in a similar manner, or the tubes may descend from a cap-piece E³, as in Fig. 4.

Having thus described my invention, what I claim as new is—

1. A hydrocarbon-burner consisting of the combination of a burner-tube D with air-inlets $b$, oil-holes $c$, and overhanging flange D′, a surrounding casing, and a cap-piece or mixing-chamber surmounting the tube D and having downwardly-directed outlets, as shown and described.

2. A hydrocarbon-burner consisting of the combination of a burner-tube D, with air-inlets $b$, oil-holes $c$, and overhanging flange D′, a surrounding casing A B, and a cap or mixing-chamber surmounting the burner and having outlets *e* on its under side for directing the jets of flame downwardly, as shown and described.

3. A hydrocarbon-burner consisting of a burner-tube D, with holes *c* and *b* and contracted throat *a*, the overhanging flange D', mounted on the burner just above holes *c*, mixing-chamber E, surmounting the burner-tube and having outlets *e* on its under side, and an inclosing-casing consisting of a pan A, with air-inlets *d*, and a ring or shell B, substantially as shown and described.

JOHN ADAMS.

Witnesses:
J. H. McEwen,
Geo. W. Stockell.